Dec. 22, 1931.  G. F. ECKART  1,837,417
SIX-WHEEL VEHICLE
Filed Jan. 31, 1929    2 Sheets-Sheet 1
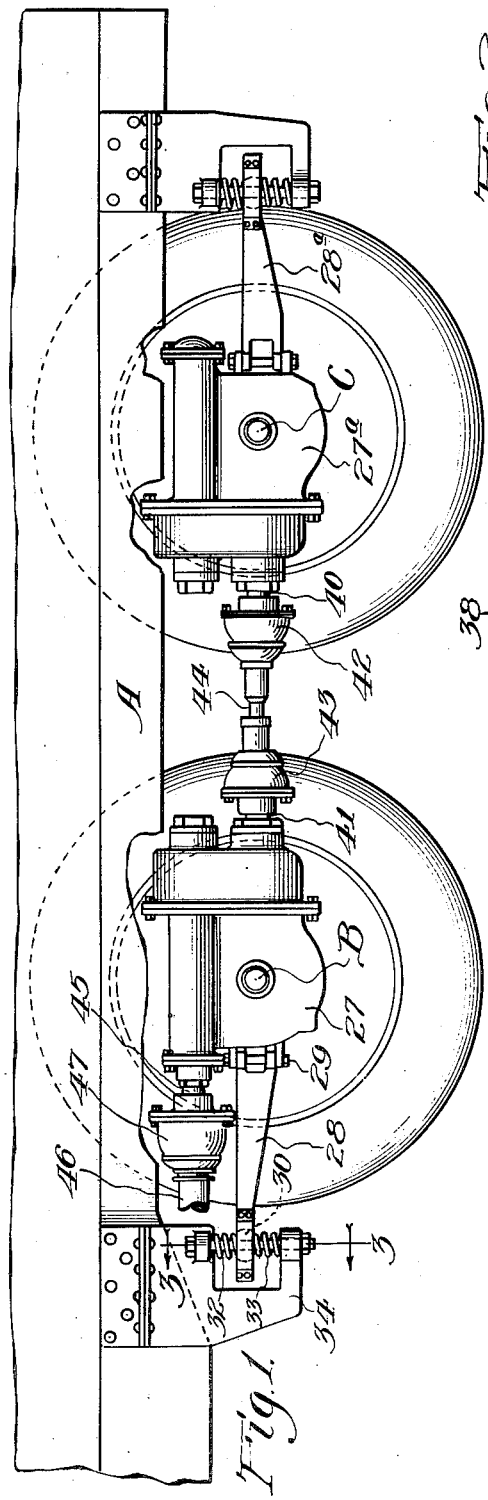
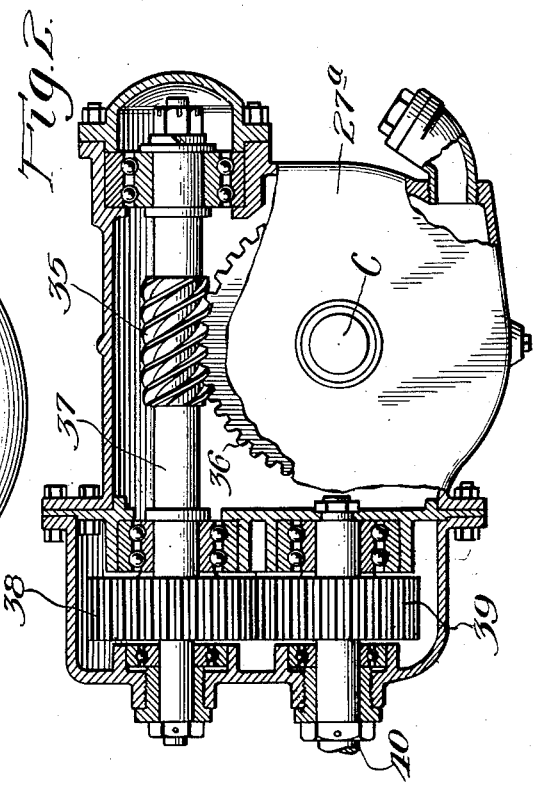
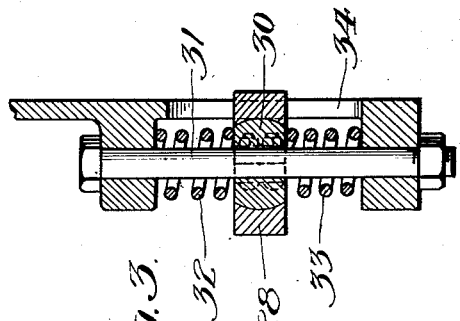
Inventor:
George F. Eckart,
By Banning & Banning
Att'ys.

Dec. 22, 1931.  G. F. ECKART  1,837,417
SIX-WHEEL VEHICLE
Filed Jan. 31, 1929  2 Sheets-Sheet 2
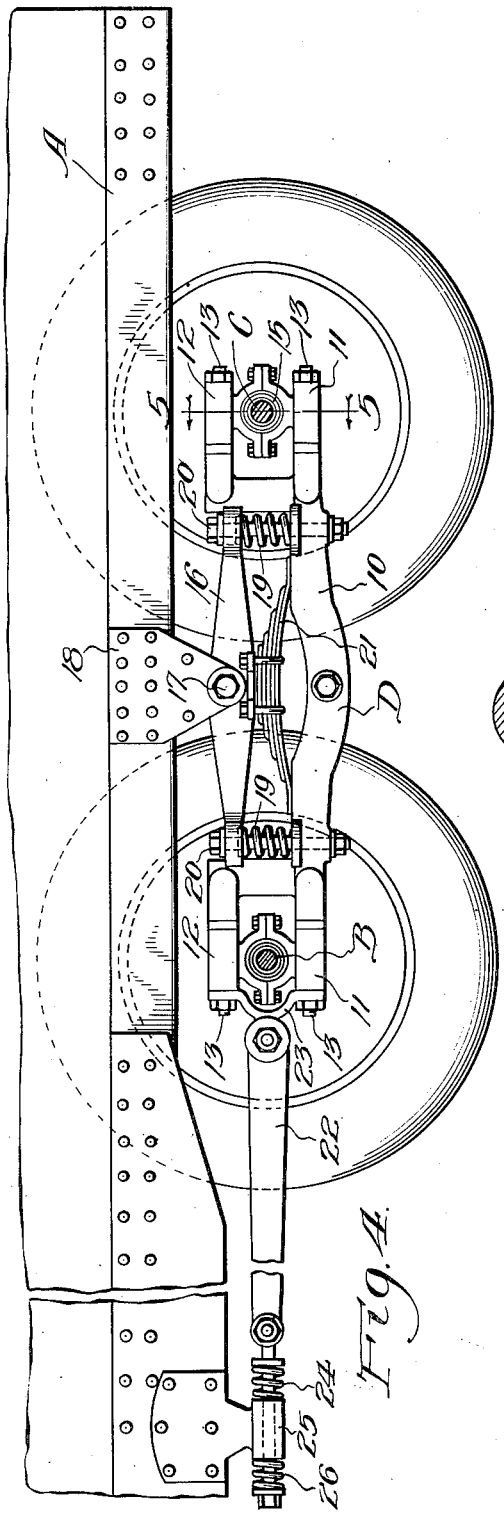
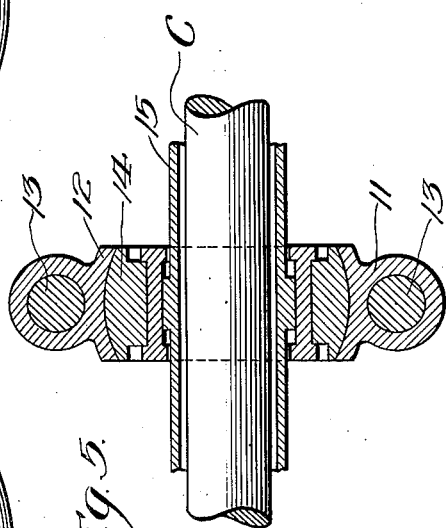
Inventor:
George F. Eckart,
By Banning & Banning
Attys Patented Dec. 22, 1931

1,837,417

UNITED STATES PATENT OFFICE

GEORGE F. ECKART, OF CHICAGO, ILLINOIS

SIX WHEEL VEHICLE

Application filed January 31, 1929. Serial No. 336,392.

An object of this invention is to provide in a six wheel vehicle an improved means of transmitting power from one of the rear axles to the other.

Another object is to provide an improved form of truck including the two rear axles and their associated and component parts.

These and other objects, as will hereinafter appear, are fully described in the following specification and shown in the accompanying drawings, in which—

Figure 1 is a partial longitudinal section through the rear axle truck;

Fig. 2 is a partial enlarged section showing the worm and worm wheel drive for the differential of the rear axle;

Fig. 3 is an enlarged vertical section showing a detail of the yieldable support for the end of the torque rod;

Fig. 4 is a view similar to Fig. 1 showing the truck for supporting the vehicle; and Fig. 5 is an enlarged vertical section on the line 5 of Fig. 4.

The embodiment illustrated comprises the six wheel vehicle, such as a truck, motor bus or the like having a chassis frame A which is flexibly and yieldably carried upon two rear axles B and C. In the construction illustrated this is accomplished by means of trucks D, one at each side of the vehicle.

Each truck D consists of a truck member 10, to the ends of which are secured semi-spherical socket members 11 and 12 by means of bolts 13. Within the semi-spherical members 11 and 12 are the spherical members 14 which are slidably mounted upon the rear axle housings 15, as shown in Fig. 5.

The truck member 10 is connected to a bar 16 which is pivotally mounted at its center by means of a pin 17 upon a plate 18 which is part of the chassis frame A. Helical springs 19 and bolts 20 connect the ends of the bar 16 with the truck member 10. The springs 19 mainly carry the load, while leaf springs 21 serve as overload springs.

Radius rods 22 are pivotally connected at one end of yolks 23 which are held by the bolts 13, and are pivotally connected at the other end to rods 24 which are slidably connected in guides 25 which are carried by the chassis frame A. Helical springs 26 permit of the necessary movement of the radius rods 22. There are two of these rods, one for each of the truck frames D.

The rear axle B is carried in a suitable housing which at its center expands into a differential housing 27, as shown in Fig. 1. This housing is prevented from rotating by means of a torque rod 28 which is pivotally connected to the differential housing 27 by means of a vertical pivot 29. The forward end of this torque rod carries a spherical socket which fits over a ball member 30, which in turn is slidably mounted upon a vertical rod 31 and held between opposing helical springs 32 and 33 which in turn are carried by a bracket 34 which is secured to the chassis frame A.

The rear axle C is similarly provided with a housing having a differential housing 27ª which is prevented from rotating by means of a radius rod 28ª. The mountings of these two are similar so that a description of one answers for the other.

In Fig. 2 is shown a detail of the drive mechanism for the rear axle C, and as this is the same as the worm gear drive mechanism of the shaft B, the latter is not shown in detail. The rear axle C is driven by means of a worm 35 and worm wheel 36, the latter driving the rear axle shafts by means of a differential (not shown) but whose construction will be apparent to anyone familiar with this art.

The worm shaft 37 is journaled in suitable bearings in the housing 27ª and has a gear 38 keyed thereon which meshes with a gear 39 on the shaft 40. This latter shaft connects with a similar shaft 41 journaled in the differential housing 27 of the rear axle B through universal couplings 42 and 43, and a splined shaft 44 which is slidable to permit of movement.

The shaft 41 is driven from the worm shaft 45 by a pair of spur gears similar to the gears 38 and 39 which are shown in Fig. 2. The worm shaft 45 is connected to the propeller shaft 46 of the vehicle by means of a universal joint 47. By using the two pairs of spur gears 38, 39 and the similar gears within the differential housing 27, it is possible to bring the axis of the shaft on the level with the axes of the rear axle shafts B and C. This is of very great importance as it permits of a minimum of movement of the shaft 44 and of the universal coupling elements 42 and 43 for a given relative movement of the rear axle shafts B and C. This is particularly true where the vehicle is passing over uneven ground where, for example, one of the wheels carried by one of these axles is raised, while the other wheel on the same side of the vehicle is lowered.

Thus it will be seen that by this arrangement much of the relative movement of the various parts is eliminated with consequent wear to these parts inasmuch as considerable power is often transmitted through the shaft 44, while the parts are in these positions of misalignment. It will be understood also that this is not a temporary or occasional condition, but one which exists to a greater or lesser extent at almost all times.

While I have described and shown but a single embodiment of my invention, it is to be understood that it is capable of many modifications. Changes, therefore, in the construction and arrangement may be made which do not depart from the spirit and scope of the invention as disclosed in the appended claims.

I claim:

1. In a six-wheel vehicle, two rear drive axles, a differential in each axle, each differential having a worm and worm-wheel drive, the axes of the worms being at a different level from that of the axes of the axles, and means connecting said worms comprising a shaft, the axis of which passes substantially through the axes of said axles.

2. In a six-wheel vehicle, two rear drive axles, a differential in each axle, each differential having a worm and worm-wheel drive, the axes of the worms being substantially coincident and at a different level from that of the axes of the axles, and means connecting said worms comprising a shaft, the axis of which passes substantially through the axes of said axles.

3. In a six-wheel vehicle, two rear drive axles, a differential in each axle, each differential having a worm and worm-wheel drive, the axes of the worms being at a different level from that of the axes of the axles, spur gears on said worm shafts, co-operating spur gears meshing therewith, and a yieldable shaft connecting said co-operating spur gears, the axis of said yieldable shaft passing normally substantially through the axes of said axles.

In testimony whereof I have hereunto set my hand and affixed my seal this 11th day of January, 1929.

GEORGE F. ECKART.